E. E. MAHER.
SELF LOCKING NUT.
APPLICATION FILED OCT. 25, 1913.
1,120,954.
Patented Dec. 15, 1914.
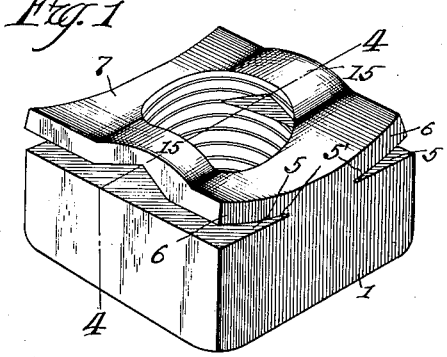
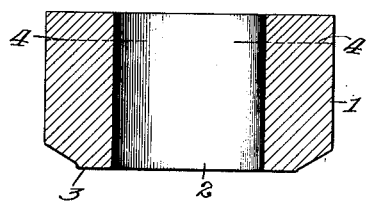
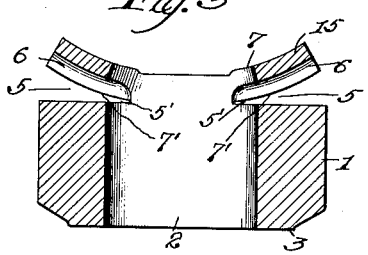
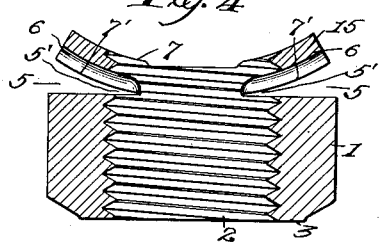
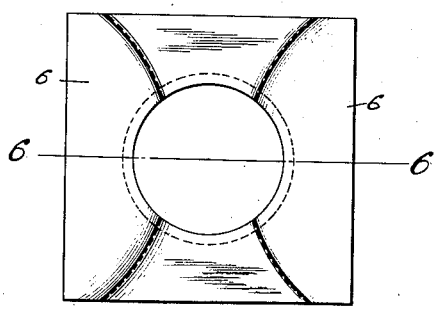
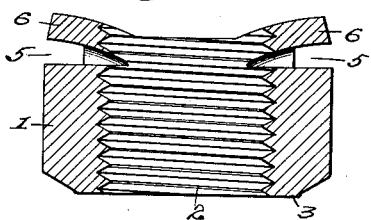
Witnesses:
Inventor:
Eugene E. Maher.

UNITED STATES PATENT OFFICE.

EUGENE E. MAHER, OF CHICAGO, ILLINOIS, ASSIGNOR TO K NUT CO., OF CHICAGO, ILLINOIS, A CORPORATION OF ILLINOIS.

SELF-LOCKING NUT.

1,120,954. Specification of Letters Patent. Patented Dec. 15, 1914.

Original application filed September 9, 1912, Serial No. 719,486. Divided and this application filed October 25, 1913. Serial No. 797,152.

*To all whom it may concern:*

Be it known that I, EUGENE E. MAHER, a citizen of the United States, and a resident of the city of Chicago, county of Cook, and State of Illinois, have invented certain new and useful Improvements in Self-Locking Nuts, of which the following is a specification.

My invention relates generally to nut and bolt locks and has particular reference to means for locking threaded nuts upon and with threaded members such as bolts and the like.

The present invention is related to and is a divisional part of my pending application Serial No. 719,486, filed September 9th, 1912 for self locking nut.

The general object of my invention is to provide a one-piece nut which shall contain in and of itself means for locking the nut upon and with a threaded bolt; which shall be of such construction that it can be manufactured at low cost; of such form that it can be easily and cheaply applied and which, when properly applied, will be automatically locked against unintentional rotation either in contact with a load surface or independent thereof.

Another object of my invention is to provide a self locking nut of such form and construction that the standard dimensions now established for nuts may be followed out for all various sizes and of such form and construction that it can be made in substantially the same ways and with substantially the same machinery as is now used in producing standard commercial nuts.

A further object of my invention is to provide a self locking nut which can be easily started upon a bolt and in which the initial locking action may be gradual and easy, to the end that the replacing of the nut may be accomplished with the least injurious strains to the metal.

My invention consists generally in the unique form, construction and arrangements of parts whereby those objects named above and others which will appear more fully hereinafter are attainable.

My invention will be more readily understood by reference to the accompanying drawings which illustrate preferred forms or embodiments thereof and in which—

Figure 1 is a perspective view of a completed nut embodying my invention; Fig. 2 is a cross-sectional view showing the nut blank after it is punched from the bar; Fig. 3 is a view showing the locking wings formed in the blank before the bolt hole is threaded; Fig. 4 is a cross-sectional view thereof substantially on the line 4—4 of Fig. 1; Fig. 5 is a plan view showing a modified form of my invention; and Fig. 6 is a cross-sectional view thereof substantially on the line 6—6 of Fig. 5.

For convenience I shall describe my invention with reference to the square nuts shown in the drawings, but I wish it to be understood that in all cases where I refer to or show a square nut I contemplate making hexagonal, octagonal, and polygonal nuts of various kinds. I have not illustrated these near modifications since it is obvious that the operation and function of the nut would be in no wise altered by the mere external conformation thereof.

As before stated, one of the objects of my invention is to provide a nut which shall be adapted to be made in substantially the same way and with substantially the same machinery as is now used in producing ordinary commercial nuts. Hence, in describing my nut, I shall describe generally the process of forming the ordinary nut. A square nut is usually made from a long bar of metal of the thickness desired in the nut and of a width equal to one side. Pieces are sheared from such a bar and bolt holes punched therein by a suitable mechanism.

Referring now particularly to Figs. 2 and 3, 1 represents the nut body after it has been severed from a bar and punched to form the bolt hole 2. In these operations a crown 3 is formed, which through long usage, has come to indicate to a mechanic that this is the top or non-load surface of the nut. I prefer, therefore, to retain this well known characteristic in my nut as a guide to the user and therefore to form the locking portion at the other end of the nut. This I do by forming the nut body wings which flare upwardly therefrom. This may be done by cutting along the dotted line 4—4 of Fig. 2 with wedge shaped knives that enter the bolt hole and which, when retracted, will form wedge-like recesses 5—5 in two opposite portions of the nut or in lieu of the wedge shaped knives, the nut blanks may be passed through suitable forming rolls or disks which will act to form the upwardly flaring wings and provide or leave wedge shaped recesses.

It will be seen that the wings are only slightly spaced from the body adjacent to bolt hole, as indicated at 5' 5'. In this manner the wing members 6, 6 are struck up without removal of metal thereby forming generally a concave outer face 7 and two inner surfaces 7' 7'. I shall refer to the outer face herewith as the nut bearing surface. Since the wing members 6, 6 are formed without removal of metal, they can be restored for the process of locking the nut in place, as will be more fully described hereinafter, to substantially the same position they occupied before separation, without development of any serious breaking strains. This I deem to be a very important and valuable feature since it overcomes many of the objections hitherto urged against locking nuts wherein the locking portion is formed by cutting into the nut and thereby removing so much metal that the locking portions break off easily.

After the wings 6, 6 which I shall herein term locking wings, are formed, the nut is threaded through from face to face as shown in Fig. 4.

As is stated, one of the objects of my invention is to provide a self locking nut which may be started easily and which shall very gradually assume the locking position. The locking position, as will be evident from the description thus far given is obtained when the wing members 6, 6 are replaced into substantial contact with the body of the nut, or, in other words, when they assume substantially their preformed position. It will be understood therefore that when starting the nut upon the bolt, the wing end starts on first and, of course, the wings will first strike the load surface. In order, therefore, that the resistance offered by the wings may be lessened, I prefer to raise or bump the central portions 15 of the wings and slightly weaken the metal at this point, hence, in screwing the nut on the bowed-up portions or humps 15, engage the home surface first. It will be noticed that I form these outwardly humped or bowed portions 15 with a slight curve and hence they materially reduce the scoring effect of the wings upon the home surface and also enable the easy turning of the nut. Further, since the wings are slightly weakened at this point, they are more easily driven back into place. A further advantage of the nut resides in the accentuated compressing action of the threads which is secured at the middle of bowed-up portions of the wings.

In Figs. 5 and 6 I illustrate another modified form of my invention which carries out in a slightly different way the easy starting feature and firm locking action of the main form. In this instance, the nut is made in substantially the same way as the other nut, up to the forming of the wings. In other words, it is punched from a bar of metal provided with a bolt hole. At this stage of the manufacture I make arc-like cuts or incisions in the nut with a tool which gives a substantial continuous bow to the wings. These, it will be understood, are formed substantially without the removal of metal in the same manner as the wings of the nut first described and are adapted for replacement to substantially contact with the body of the nut by engagement with the home surface. Since the wing portions are rounded or bowed the nut may be easily screwed upon the bolt because the scoring action will be reduced to a minimum and because of the bowed feature the wings may also be readily replaced or set back.

In whatever form, therefore, in which my invention is embodied, it will now be clear that the desirable and important advantages are retained: i. e. the nut is cut and punched to form a bolt hole; the locking wings are formed in upwardly inclined position substantially without removal of metal and the nut is threaded from face to face, then by restoring the wings to their preformed position, the nut is powerfully locked against unintentional movement of the bolt. This, it will be understood, is the case even should the home surface recede from the locking wings, since the wings are not of such an elastic nature as to spring back entirely and release the total locking force.

It should be obvious from the foregoing description that the objects and purposes of my invention are fully attained in the embodiments of the same herein disclosed, and that all the disadvantages and defects of locking hitherto devised are remedied.

I claim:

1. As an article of manufacture, a self locking nut comprising a body portion and a nut locking portion integral therewith, a bolt hole being formed in both portions the nut locking portion comprising locking wings flared away from the body portion and formed by transverse cuts which enter the nut from two opposite sides, the said wings being humped or bowed as and for the purpose specified.

2. As an article of manufacture, a self locking nut of substantially standard nut dimensions, comprising a nut body portion and a nut locking portion integral therewith, a threaded bolt hole through both portions, the said nut locking portion comprising two locking wings flared away from the body portion and formed by transverse cuts which enter the bolt hole from two opposite sides, each of the locking wings being centrally and outwardly humped and the locking wings adapted to be restored substantially to original position in use.

3. As an article of manufacture, a nut comprising a body portion, having at one of its ends, two substantially uniform thickness locking wings outwardly inclined from two opposite sides of the nut, each of the wings being reduced in thickness and outwardly humped at the middle and the nut being provided with a threaded bolt hole extending from face to face.

4. A self locking nut of substantially standard nut dimensions, comprising a body portion and a locking portion integral therewith, said locking portion comprising two outwardly extending oppositely disposed locking wings, a threaded bolt hole through the entire nut, said locking wings being spaced from the body portion by wedge-like recesses so that the locking wings are substantially tangential at their juncture with the body portion and each of the wings being outwardly humped as and for the purpose specified.

5. As an article of manufacture, a self locking nut of substantially standard nut dimensions, comprising a nut body portion and a nut locking portion integral therewith, said nut having a bolt hole, said locking portion comprising two locking wings flared away from two opposite sides of the nut and formed substantially without removal of metal by transverse cuts which enter the bolt hole from two opposite nut faces, each of the locking wings being outwardly humped and centrally weakened, the locking wings when brought into contact with the load surface adapted to be restored to positions contacting the body portion substantially throughout the surface of the wings.

In testimony whereof, I have hereunto set my hand this 15th day of October, 1913, in the presence of two subscribing witnesses.

EUGENE E. MAHER.

Witnesses:
ARTHUR W. NELSON,
JOHN R. LEFEVRE.